United States Patent
Regnier et al.

(10) Patent No.: US 8,195,158 B2
(45) Date of Patent: Jun. 5, 2012

(54) MAINTAINING IMS REGISTRATION WHILE DISCONNECTED FROM IP BEARER

(75) Inventors: Jean Regnier, Laval (CA); Claude Kawa, Montreal (CA); Haraldur Thorkelsson, Montréal (CA)

(73) Assignee: Synchronica plc, Tunbridge Wells (GB)

(*) Notice: Subject to any disclaimer, the term of this patent is extended or adjusted under 35 U.S.C. 154(b) by 897 days.

(21) Appl. No.: 12/165,849

(22) Filed: Jul. 1, 2008

(65) Prior Publication Data
US 2009/0170512 A1 Jul. 2, 2009

Related U.S. Application Data

(60) Provisional application No. 60/948,075, filed on Jul. 5, 2007.

(51) Int. Cl.
*H04W 4/00* (2009.01)
*G06F 17/00* (2006.01)
(52) U.S. Cl. .................. 455/435.1; 370/338; 726/12
(58) Field of Classification Search .............. 455/435.1; 726/12; 370/338
See application file for complete search history.

(56) References Cited

U.S. PATENT DOCUMENTS

| | | | |
|---|---|---|---|
| 5,812,951 A * | 9/1998 | Ganesan et al. | 455/445 |
| 6,201,962 B1 * | 3/2001 | Sturniolo et al. | 455/432.2 |
| 6,353,848 B1 * | 3/2002 | Morris | 709/203 |
| 6,665,537 B1 * | 12/2003 | Lioy | 455/435.1 |
| 6,766,168 B1 * | 7/2004 | Lim | 455/435.1 |
| 6,847,632 B1 | 1/2005 | Lee et al. | |
| 2002/0111169 A1 * | 8/2002 | Vanghi | 455/436 |
| 2002/0138622 A1 | 9/2002 | Dorenbosch et al. | |
| 2002/0161833 A1 * | 10/2002 | Niven et al. | 709/203 |
| 2003/0217174 A1 | 11/2003 | Dorenbosch et al. | |
| 2004/0081118 A1 * | 4/2004 | Mukherjee et al. | 370/328 |
| 2004/0184436 A1 * | 9/2004 | Abrol et al. | 370/349 |
| 2004/0187021 A1 | 9/2004 | Rasanen | |
| 2005/0202819 A1 | 9/2005 | Blicker | |
| 2006/0056415 A1 * | 3/2006 | Lee et al. | 370/392 |
| 2006/0149847 A1 * | 7/2006 | Meskauskas et al. | 709/229 |
| 2007/0014281 A1 * | 1/2007 | Kant | 370/352 |
| 2007/0032234 A1 * | 2/2007 | Jain et al. | 455/435.1 |
| 2007/0058585 A1 * | 3/2007 | Mudigonda et al. | 370/331 |
| 2007/0156909 A1 * | 7/2007 | Osborn et al. | 709/227 |

(Continued)

FOREIGN PATENT DOCUMENTS

WO WO2005038551 4/2005

(Continued)

OTHER PUBLICATIONS

International Search Report/Written Opinion received in Corresponding PCT Application No. PCT/CA2008/001232, date Oct. 17, 2008, 8 Pages.

(Continued)

*Primary Examiner* — Christopher M Brandt
(74) *Attorney, Agent, or Firm* — Sequel Group LLC (57) ABSTRACT

A proxy maintains registration in an IP Multimedia Subsystem (IMS) network for a user equipment while the user equipment is disconnected from the system. The user equipment connects to the proxy and establishes a proxy session with the proxy. The proxy opens a proxy session for the user equipment, establishes a registration within said IMS network for IMS services on behalf of the user equipment; and maintains the registration for the user equipment for the duration of the proxy session. While the proxy session is ongoing, the user equipment can disconnect from the IP proxy.

34 Claims, 8 Drawing Sheets

U.S. PATENT DOCUMENTS

| | | | |
|---|---|---|---|
| 2007/0184860 A1* | 8/2007 | Jansson | 455/466 |
| 2008/0089290 A1* | 4/2008 | Coulas et al. | 370/331 |
| 2008/0089308 A1* | 4/2008 | Jentz et al. | 370/342 |
| 2008/0092224 A1* | 4/2008 | Coulas et al. | 726/12 |

FOREIGN PATENT DOCUMENTS

| | | |
|---|---|---|
| WO | WO2007075213 | 7/2007 |

OTHER PUBLICATIONS

Lin, Yi-Bing; Lo, Yung-Chieh; and Rao, Herman C.-H., "A Push Mechanism for GPRS Supporting Private IP Addresses," IEEE Communications Letters, vol. 7, No. 1, Jan. 2003, pp. 24-26.

3rd Generation Partnership Project; Technical Specification Group Services and System Aspects; Vocabulary for 3GPP Specifications (Release 7), 3GPP TR 21.905, V7.3.0, (Mar. 2007), 55 pages, http://www.3gpp.org/ftp/Specs/2007-03/rel-7/21_series/21905-730.zip.

3rd Generation Partnership Project; Technical Specification Group Services and System Aspects; IP Multimedia Subsystem (IMS); Stage 2 (Release 7); 3GPP TS 23.228 V7.6.0 (Dec, 2006), 215 pages, http://www.3gpp.org/ftp/Specs/2006-12/Rel-7/23_series/23228-760.zip.

Handley, M. and Jacobson, V., "SDP: Session Description Protocol," Network Working Group, Request for Comments: 2327, Apr. 1998, 40 pages, http://www.ietf.org/rfc/rfc2327.txt.

Rosenberg, J, and Schulzrinne, H., "An Offer/Answer Model with the Session Description Protocol (SDP)," Network Working Group, Request for Comments: 3264, Jun. 2002, 24 pages, http://www.ietf.org/rfc/rfc3264.txt.

Rosenberg, J., et al., "SIP: Session Initiation Protocol," NetworkWorking Group, Request for Comments: 3261, Jun. 2002, 252 pages, http://www.ietf.org/rfc/rfc3261.txt.

Open Mobile Alliance, Client-Server Protocol Transport Bindings, OMA-TS-IMPS_CSP_Transport-V1_3-20070123-A, Approved Version 1.3-23 Jan. 2007, 31 pages, http://www.openmobilealliance.org/Technical/release_program/docs/IMPS/V1_3-20070123-A/OMA-TS-IMPS_CSP_Transport-V1_3-20070123-A.pdf.

\* cited by examiner

MAINTAINING IMS REGISTRATION WHILE DISCONNECTED FROM IP BEARER

RELATED APPLICATION

This application claims the benefit of U.S. Provisional Patent Application 60/948,075 filed Jul. 5, 2007, which is incorporated herein by reference.

BACKGROUND

The present invention relates generally to Internet Protocol (IP) multimedia services and, more particularly, to maintaining an IP Multimedia Core Network Subsystem (IMS) registration while a user equipment (UE) is disconnected from an IP bearer.

IMS is a standardized architecture for network operators and service providers that wish to provide mobile and fixed IP multimedia services to customers irrespective of the customers' location, access technology, and user equipment. IMS runs over standard IP, and provides network operators and service providers the ability to control and charge for individual IMS-based services, and allows customers to execute services both in home and roaming networks. These IMS-based services can use the same protocols as existing Internet services, and may comprise for example: presence, messaging, push to talk (PTT), and telephony.

In order to maintain access to the IMS services, it is mandatory for the UE to keep the IP connectivity access network (IP-CAN) bearer established, and many IMS services can be expected to be continually accessed for a long duration, such as hours or days. On some IMS services the UE is expected to be "always-on", available from power up until power down. Consider for example a presence service in which the UE automatically registers into an IMS presence service upon power up. The associated user then becomes online for all the other IMS users who subscribed and are authorized to see the user's presence. The user should then stay online for as long as the UE is powered up. This presence service requires the UE to register in the IMS and remain registered in the IMS for as long as the UE is powered up. Similarly, in an always-on IM or PTT IMS service, the user expects to be able to be contacted by IM or voice by his contacts at any time once the UE is powered up. This again requires the UE to register in the IMS and remain registered in the IMS for as long as the UE is powered up.

In order for these IMS services to function, the UE needs to maintain IP connectivity through the IP-CAN bearer. Otherwise, the UE must de-register or be de-registered from the IMS, thereby stopping the IMS services. Maintenance of a wireless IP-CAN bearer for a long duration, such as hours or days, can be expensive and difficult, if not impossible.

For financial reasons, most mobile network operators deploy their high-speed IP-CAN infrastructure such as Universal Mobile Telecommunications System (UMTS) in a gradual manner. Initially, coverage is spotty, and increases as capacity is built up. Some mobile network operators will provide access to IMS services via only their high-speed IP-CAN infrastructure, though they may implement mitigation strategies to increase their IMS coverage. For instance, they may deploy UE's supporting high-speed access to IMS services in areas where such high-speed access is deployed, but also supporting IMS access through legacy wireless data communication technologies such as GPRS or CDMA in areas where high-speed IMS access technology is not deployed. Nonetheless, an IMS UE may not be able to maintain the IP-CAN bearer in the case that IMS services are only available through high-speed IP-CAN infrastructure while the coverage is spotty. Alternatively, if the IMS UE maintains IMS access when outside the coverage of the high-speed IP-CAN infrastructure by reverting to legacy technology such as GPRS or CDMA, this requires the IMS UE to establish an IP-CAN bearer over the legacy technology, and then to re-register in IMS over this latter IP-CAN bearer. As the IMS UE moves inside and outside of coverage of the high-speed IP-CAN infrastructure, the IMS UE must then constantly re-establish its IP-CAN bearer with the high-speed IP-CAN infrastructure or the legacy infrastructure, and re-register into IMS. These constant re-establishments of IP-CAN bearers and registrations into IMS impose increased signaling traffic on the UE, the mobile network, and the IMS, thus imposing increased costs.

The requirement to maintain the IP-CAN bearer also imposes constraints on the UE and network resources. The need for the UE to maintain IP connectivity through the IP-CAN bearer can particularly become a stringent constraint if the UE is accessing IMS services through legacy technologies such as GPRS or CDMA. Maintaining long-lived IP connections through such legacy technologies can severely tax both the user equipment (e.g., battery life can be shortened) as well as the network resources (e.g., in GPRS a large number of Packet Data Protocol (PDP) contexts may need to be maintained active concurrently).

For the foregoing reasons, there is a need to enable an IMS UE to maintain its registration in its IMS services even while the UE is disconnected from an IP bearer.

SUMMARY

The present invention satisfies this need by inserting a proxy between the UE and the IMS, where in one exemplary embodiment, the proxy opens a proxy session during which the proxy maintains an IP-CAN bearer with the IMS on behalf of the UE without regard to the existence an IP-CAN bearer between the UE and the proxy. In another exemplary embodiment, the proxy and the UE implement a protocol model based on the use of two distinct channels between the proxy and the UE: a data channel, which is the IP-CAN bearer, and a communication initiation request (CIR) channel. The data channel is used whenever data is to be exchanged between the proxy and the UE, and the CIR channel is used by the proxy to convey notifications to the UE when the proxy has data to communicate to the UE and an IP-CAN bearer to the UE does not currently exist, where the CIR informs the UE that the UE should activate an IP-CAN bearer and send a poll request in order to receive the stored and forwarded message from the proxy. The use of this protocol model enables the proxy to maintain a proxy session that allows for communication to appear continuous to the IMS over a long duration without requiring that an actual IP-CAN bearer be maintained between the UE and the proxy during this long duration.

In one exemplary embodiment, the proxy isolates the IP network that the proxy uses with the UE from the IP network that the proxy uses with the IMS, enabling the UE to be assigned or reassigned a new IP address without impacting the state of the UE in the IMS system. To support the communication between the UE and the IMS system, the proxy maintains a table mapping the IP address currently assigned to the UE with the corresponding IP address associated with the UE in the IMS system, and relays messages between the UE and the IMS system accordingly.

BRIEF DESCRIPTION OF THE DRAWINGS

These and other advantages, features, and aspects of the present invention will become more apparent upon reading of the following description, appended claims, and accompanying drawings where:

DETAILED DESCRIPTION

The present invention enables an IMS UE to maintain its registration in the IMS even while the UE is disconnected from an IP bearer, thus allowing an IMS UE to maintain its registration in the IMS even when the IMS coverage is spotty, and also enabling an IMS UE to be supported by legacy UE and network technologies, without requiring the UE to maintain a long-lived IP connection.

Figure 1:
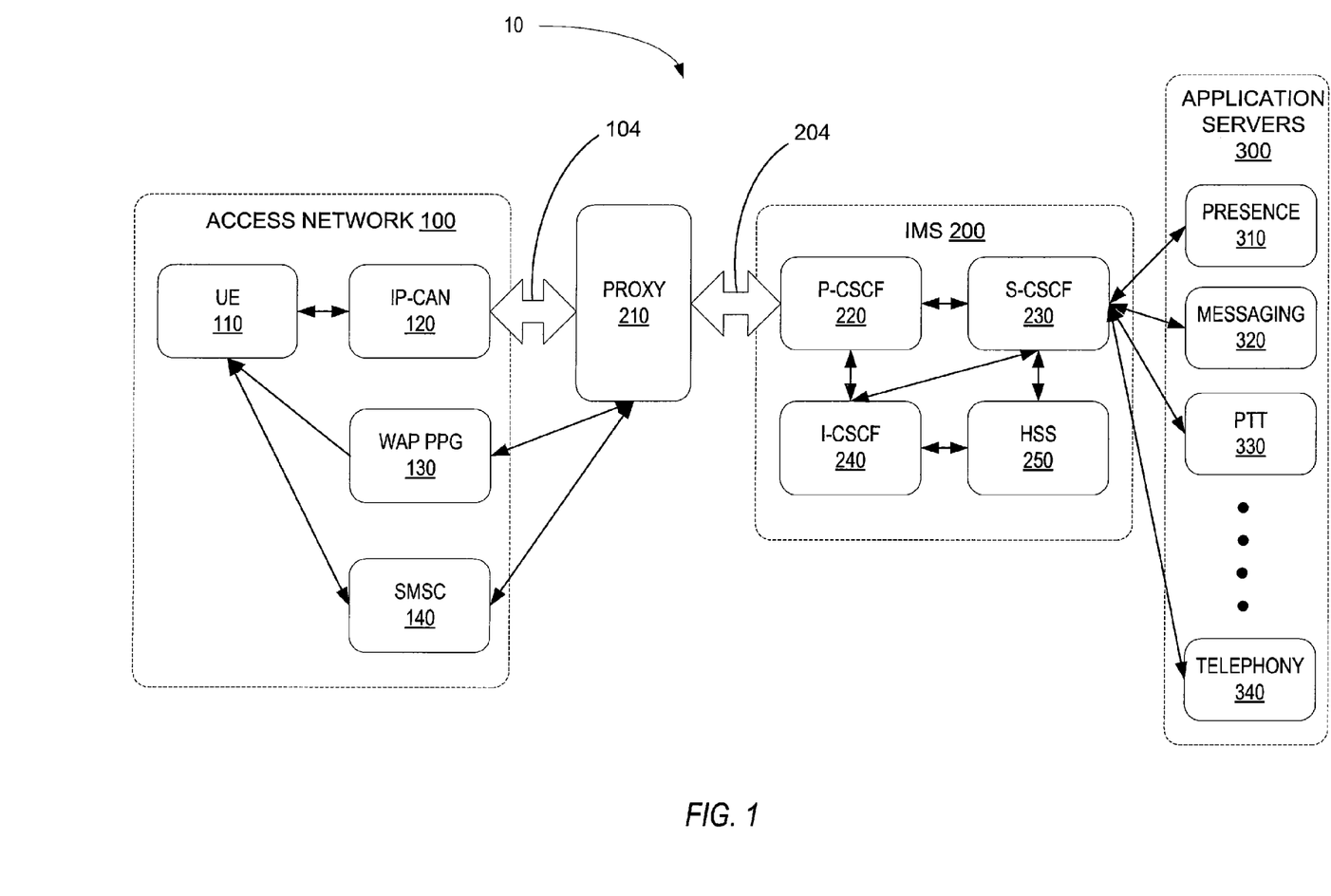
FIG. 1 is a block diagram that illustrates an IP multimedia service system according to one embodiment of the present invention.

Except for where indicated otherwise, definitions of IMS related terminology contained herein are according to the definitions provided in 3GPP TS 21.905 v7.3.0 "Vocabulary for 3GPP Specifications" dated March 2007. Referring now to FIG. 1, an IP multimedia service system 10 according to an embodiment of the present invention will now be described. The IP multimedia service system 10 comprises an access network 100, an IP multimedia core network subsystem (IMS) 200, and one or more application servers 300.

The access network 100, which comprises one or more user equipment (UE) 110 and an IP connectivity access network (IP-CAN) 120, provides fixed access (such as DSL, cable, or Ethernet) or wireless access (such as W-CDMA, CDMA2000, GPRS, WiFi, or WiMax) to the IMS 200. According to another embodiment of the present invention, the access network 100 further comprises one or more of a wireless access protocol push proxy gateway (WAP PPG) 130 and a short message service center (SMSC) 140. Between the access network 100 and the IMS 200, a proxy 210 is introduced.

The IMS 200 uses open interfaces and an access independent session control protocol (SCP), such as the Session Initiation Protocol (SIP), to support multi-media applications. Session description protocol (SDP) is used for media negotiation. SDP is described in IETF RFCs 2327 and 3264. SIP is used by the UE 110 to register in the IMS 200 and de-register from the IMS 200 in order to establish, maintain, and close IMS sessions. SIP is a session control protocol for establishing, modifying and terminating communication sessions between one or more participants. These sessions may include, for example, Internet multimedia conferences, Internet telephony calls, and multimedia distributions. SIP is described in the IETF document RFC 3261. While a preferred embodiment of the invention as described herein uses the SIP, those skilled in the art will appreciate that the present invention may use other SCPs as well. Another well-known protocol comparable to the SIP is H.323. The details of SIP are not material to the present invention.

The IMS 200 according to a preferred embodiment comprises a proxy call session control function (P-CSCF) 220, a serving call session control function (S-CSCF) 230, an interrogating call session control function (I-CSCF) 240, and a home subscriber server (HSS) 250. The P-CSCF 220, the S-CSCF 230, and the I-CSCF 240 function as SIP servers to process session control signaling used to establish, modify and terminate a communication session. Functions performed by the P-CSCF 220, S-CSCF 230, and I-CSCF 240 include call control, address translation, authentication, capability negotiation, and subscriber profile management. The HSS 250 interfaces with the P-CSCF 220, the S-CSCF 230, and the I-CSCF 240 to provide information about the subscriber's current location and subscription information. The IMS 200 may include additional elements, which are not shown in FIG. 1 and are not important to understand the present invention. The IMS 200 enables the UE 110 to utilize multimedia services based on and built upon Internet applications, services and protocols, which are provided by the application servers 300.

The application servers 300 provide multimedia services, and comprise in this example a presence server 310, a messaging server 320, a push to talk (PTT) server 330, and a telephony server 340. Additional multimedia service servers may be provided beyond those included herein.

In order to register in the IMS 200, the UE 110 first connects to the IP-CAN 120 and acquires a UE IP-CAN bearer 104. Once this connectivity is established, the UE 110 registers in the IMS 200. For this purpose, according to 3GPP TS 23.228 v7.6.0 "IP Multimedia Subsystem (IMS); Stage 2" dated December 2006, which is incorporated herein by reference in its entirety, the UE 110 connects to the P-CSCF 220. However, in a preferred embodiment of the invention, the UE 110 connects to the proxy 210, which in turn connects to the P-CSCF 220 on behalf of the UE 110. The P-CSCF 220 determines the S-CSCF 230 for the UE 110 by querying an I-CSCF 240. Once the P-CSCF 220 obtains the S-CSCF 230 for the UE 110, the P-CSCF 220 relays the registration to the S-CSCF 230. The S-CSCF 230 then gets from the HSS 250 a profile defining the multimedia services that the UE 110 is entitled to use, and then registers the UE 110 with one or more application servers 300 providing the authorized services. These services may comprise for instance one or more of presence, messaging, push to talk, and telephony services, as well as many other services.

In order to maintain access to these IMS services, it is mandatory for the UE 110 to keep the UE IP-CAN bearer 104 established according to 3GPP TS 23.228 v7.6.0 "IP Multimedia Subsystem (IMS); Stage 2" dated December 2006. This document is explicit on this matter. Specifically:

If the UE 110 explicitly deactivates the UE IP-CAN 104 bearer that is being used for IMS signaling, the UE 110 shall first de-register from the IMS 200 (while there is no IMS session in progress).

If the UE 110 explicitly deactivates the UE IP-CAN bearer 104 that is being used for IMS signaling while an IMS session is in progress, the UE 110 must first release the session and de-register from the IMS 200 and then deactivate the UE IP-CAN bearer 104.

In order to be able to deliver an incoming IMS session, the UE IP-CAN bearer 104 that is being used for IMS signaling needs to remain active as long as the UE 110 is registered in the IMS 200.

To meet these requirements, while at the same time allowing the UE 110 to remain registered in the IMS 200 without the UE IP-CAN bearer 104, the UE proxy 210 is introduced between the IP-CAN 120 and the P-CSCF 220, which establishes and maintains, on behalf of the UE 110, an IP-CAN bearer 204 from the proxy 210 to the IMS 200. To provide the proxy IP-CAN bearer 204, the proxy 210 connects to the P-CSCF 220 over a high-speed connection, preferably using a wired medium such as fiber or copper, though the connection could alternatively be wireless. This connection can transit through several networks elements at the transport level, such as bridges, load balancers, switches and routers.

FIGS. 2-5 illustrate exemplary call flows for embodiments of the present invention. As will be shown, the introduction of the proxy 210 advantageously does not require modifications to any of the components of the IMS 200, nor to the IP-CAN 120.

Figure 2:
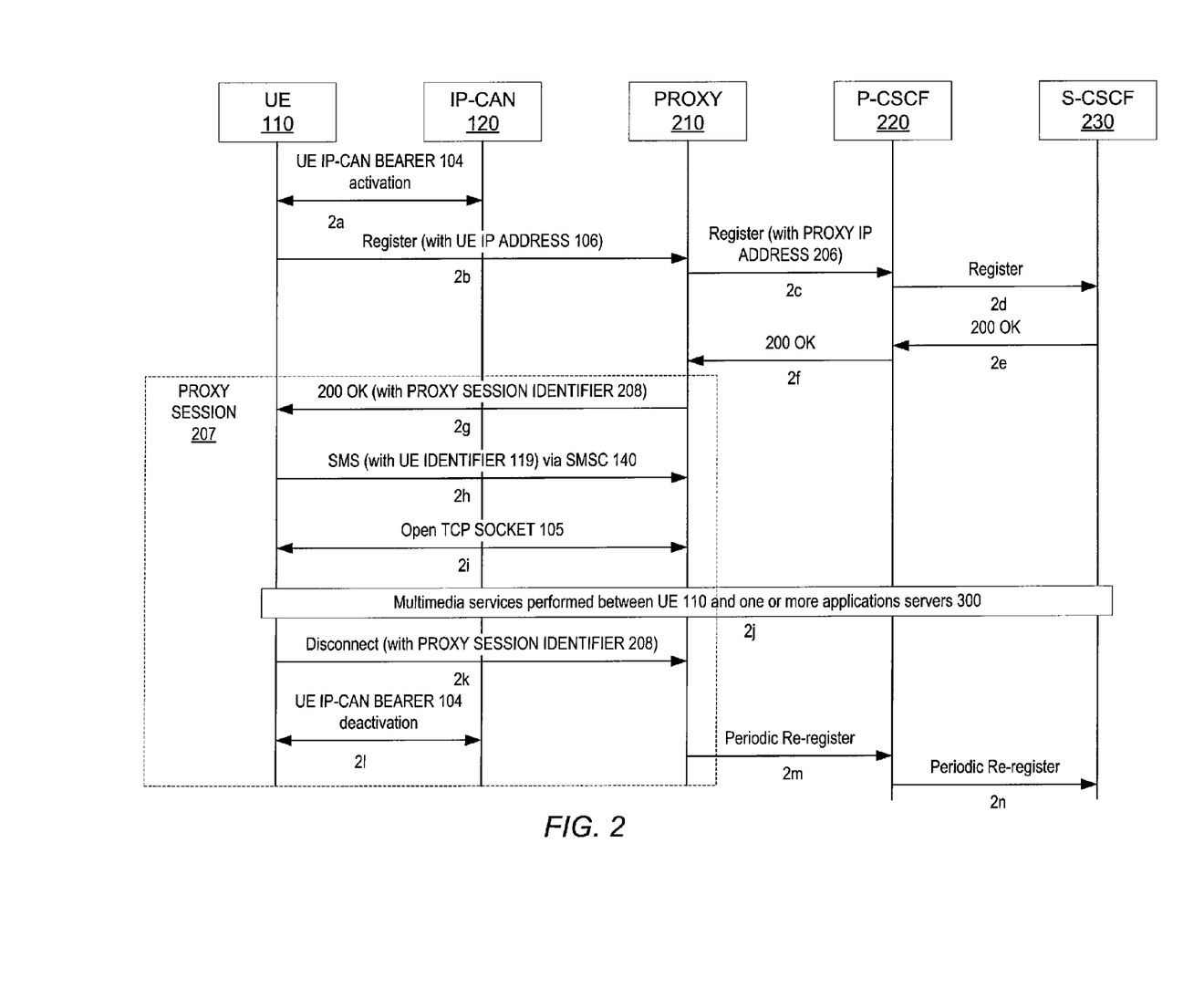
FIG. 2 illustrates a proxy session setup and maintenance call flow according to another embodiment of the present invention.

FIG. 2 illustrates one exemplary embodiment of the present invention in which a proxy session 207 is set up and maintained between the UE 110 and the proxy 210 to allow the UE 110 to remain registered in the IMS 200 even without the active UE IP-CAN bearer 104. The IMS 200 components I-CSCF 240 and HSS 250 are left out of this call flow to simplify the figure because the functionality associated with both of these components within the present invention remains unchanged from the conventional functionality.

To register in the IMS 200, the UE 110 activates the UE IP-CAN bearer 104 to acquire a UE IP address 106 (step 2*a*). During the activation, the IP-CAN 120 typically verifies that the UE 110 is authorized to make use of IP services, and the IP-CAN 120 normally associates a UE identifier 119 to the UE IP address 106 that the IP-CAN 120 allocates. Optionally, the IP-CAN 120 may provide an address for the P-CSCF 220 to the UE 110 during the UE IP-CAN bearer 104 activation. Once the UE IP-CAN bearer 104 is activated, the UE 110 then sends an IMS registration request to the proxy 210 (step 2*b*). The UE 110 can determine the address of the proxy 210 through a variety of methods, such as: obtaining the proxy 210 address during the UE IP-CAN bearer 104 activation from the IP-CAN 120; using standard dynamic host configuration protocol (DHCP); or retrieving the proxy 210 address stored on the UE 110. The IMS registration request may optionally include the UE identifier 119 for the UE 110, which the UE 110 can determine through a variety of methods, such as: obtaining the UE identifier 119 during the UE IP-CAN bearer 104 activation from the IP-CAN 120; or retrieving the UE identifier 119 stored on the UE 110. The IMS registration request may also optionally include the address for the P-CSCF 220, which the UE 110 can determine through a variety of methods, such as: obtaining the address for the P-CSCF 220 during the UE IP-CAN bearer 104 activation from the IP-CAN 120; using standard dynamic host configuration protocol (DHCP); or retrieving the address for the P-CSCF 220 stored on the UE 110.

Upon receipt of the IMS registration request from the UE 110, the proxy 210 forwards the IMS registration request to the P-CSCF 220 using the proxy IP-CAN bearer 204, replacing as necessary the IP address 106 of the UE with an associated IP address 206 of the proxy (step 2*c*). An association between the UE IP address 106 and the proxy IP address 206 is stored in memory of the proxy 210 to enable continued relaying of messages between the UE 110 and the IMS 200 through the proxy 210 during the lifetime of the proxy session 207. The proxy 210 determines the address for the P-CSCF 220 through one or more of a variety of methods, such as: obtaining the address for the P-CSCF 220 from the UE 110 in the IMS registration request; using standard dynamic host configuration protocol (DHCP); or retrieving the address for the P-CSCF 220 stored on the proxy 210. The proxy IP-CAN bearer 204 to the IMS 200 can be maintained during the lifetime of the proxy session 207, even when the UE IP-CAN bearer 104 to the proxy is not available. Thus, the proxy 210 makes the UE 110 appear available to IMS services even while the UE 110 is disconnected.

The P-CSCF 220 forwards the IMS registration request to the S-CSCF 230 (step 2*d*), then the S-CSCF 230 indicates a successful registration by replying with a "200 OK" indication, which is then forwarded to the proxy 210 (steps 2*e* and 2*f*). The proxy 210 then sends the "200 OK" success confirmation to the UE 110 and includes a proxy session identifier 208 in the confirmation that identifies the proxy session 207 now established (step 2*g*), which the UE 110 stores in memory for future use.

Figure 3:
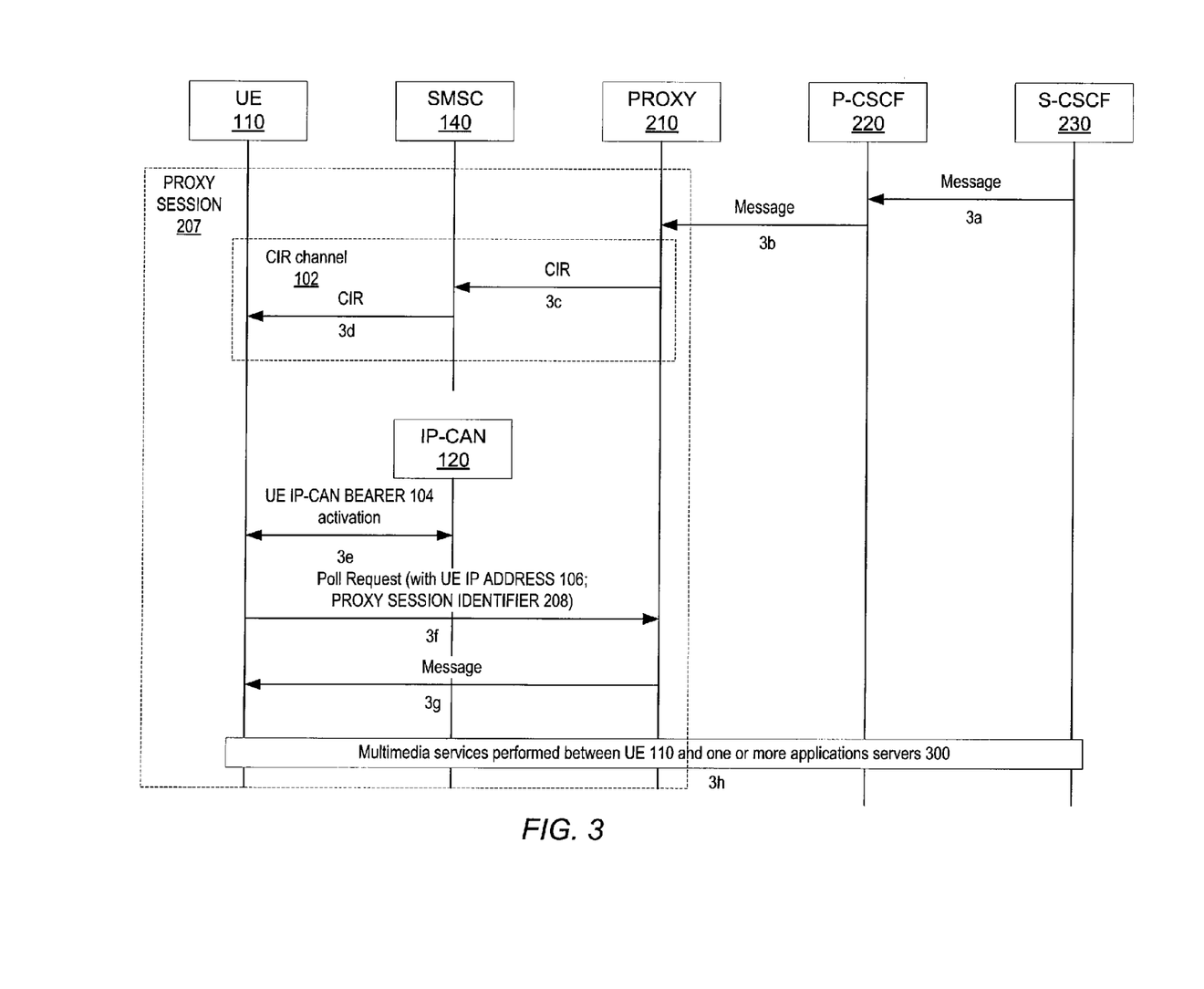
FIG. 3 illustrates a proxy communication initiation request call flow according to another embodiment of the present invention.

In the case that the proxy 210 does not have the UE identifier 119 for the UE 110 to associate with the proxy session 207, then the UE 110 optionally sends a short message service (SMS) message to the proxy 210 via the SMSC 140, which allows the proxy 210 to identify the UE identifier 119 of the UE 110 as the "from" address of the SMS message (step 2*h*). At the end of this step, the proxy 210 has the UE identifier 119 that the proxy 210 needs to activate a communication initiation request (CIR) channel 102, as shown in FIG. 3, associated with the proxy session 207. The CIR channel 102 may use standalone SMS or WAP push over SMS as the transport binding, though other transport bindings could be utilized. The CIR channel 102 need not be set up in the case that for the multimedia services, the messages will only originate from the UE 110, and not from the application servers 300. The proxy 210 can determine the UE identifier 119 through a variety of methods, such as: obtaining the UE identifier 119 in the IMS registration request from the UE 110; querying a database of the mobile operator, such as the HSS 250 or an HLR (not shown) using the UE IP address 106; or obtaining the UE identifier 119 in the SMS message from the UE 110.

Optionally, the UE 110 opens a TCP socket 105 to the proxy 210 (step 2*i*) that the UE 110 maintains as long as the UE IP-CAN bearer 104 is active.

In step 2*j*, multimedia services are performed between the UE 110 and one or more application servers 300, where the transactions carrying these services are relayed through the proxy 210, the P-CSCF 220 and the S-CSCF 230.

When the UE 110 some time later deactivates the UE IP-CAN bearer 104, the UE 110 optionally may prior to UE IP-CAN bearer 104 deactivation send a disconnect message with the proxy session identifier 208 to the proxy 210 to indicate the pending UE IP-CAN bearer 104 deactivation (step 2*k*). Upon UE IP-CAN bearer 104 deactivation, the UE 110 relinquishes the UE IP address 106 (step 2*l*). The UE 110 may explicitly close the TCP socket 105, if open, prior to UE IP-CAN bearer 104 deactivation, or inherently close the TCP socket 105, if open, by virtue of the UE IP-CAN bearer 104 deactivation itself. This deactivation of the UE IP-CAN bearer 104 arises for instance if the UE 110 has been inactive for some time. This step can also be initiated by the IP-CAN 120. Although the UE 110 deactivates the UE IP-CAN bearer 104, and the UE 110 relinquishes the UE IP address 106, the proxy 210 still maintains the proxy IP-CAN bearer 204 on behalf of the UE 110 to the P-CSCF 220. In this manner, the UE 110 maintains the IMS registration. In addition, the proxy 210 may send a periodic request to re-register in the IMS on behalf of the UE 110 though the P-CSCF 220 to the S-CSCF 230 as long as the proxy session 207 exists (step 2m and 2n) to enable the UE 110 to maintain its registration in IMS 200 in the event that lack of activity from the UE 110 would otherwise cause the IMS 200 to de-register the UE 110.

FIG. 3 illustrates one exemplary embodiment of the present invention in which the IMS 200 generates a new message for the UE 110 when the UE 110 does not have an active UE IP-CAN bearer 104, but does have an active proxy session 207. When an indication of the new message for the UE 110 is sent from the S-CSCF 230 via the P-CSCF 220 to the proxy 210 (steps 3a and 3b), the proxy 210 detects that the UE 110 does not have an active UE IP-CAN bearer 104, but does have an active proxy session 207, and therefore sends a communication initiation request (CIR) over the CIR channel 102 to the UE 110 (steps 3c and 3d) and stores the new message in memory. The proxy 210 detects that the UE 110 does not have an active UE IP-CAN bearer 104 through one of various methods, such as: determining that the TCP socket 105 to the UE 110 is not open; or having earlier received the disconnect message from the UE 110. Although steps 3c and 3d illustrate the CIR channel 102 using standalone SMS as the transport binding, other transport bindings could be utilized, such as WAP push using SMS as a bearer. If the UE 110 does not activate the UE IP-CAN bearer 104 within a predetermined time period after the CIR is sent to the UE 110 over the CIR channel 102, the proxy 210 closes the proxy session 207. Alternatively, the proxy 210 closes the proxy session 207 in the case that the UE 110 does not activate the UE IP-CAN bearer 104 within a predetermined time period after a configurable number of CIRs are sent to the UE 110 over the CIR channel 102.

Otherwise, upon receipt of the CIR, the UE 110 activates the UE IP-CAN bearer 104 and sends a poll request to the proxy 210 (steps 3e and 3f). The UE 110 may acquire a new UE IP address 106 upon activation of the UE IP-CAN bearer 104 which the UE 110 provides to the proxy 210, which replaces as necessary the previously stored UE IP address 106 with the new UE IP address 106. The proxy 210 may revalidate the new UE IP address 106 with the UE identifier 119 of the UE 110 by querying a database of the mobile operator, such as the HSS 250 or an HLR (not shown). The proxy 210 forwards the stored new message to the UE 110 (step 3g). Further messages can then be exchanged, and multimedia services are performed between the UE 110 and one or more application servers 300 (step 3h), where the transactions carrying these services are relayed through the proxy 210, the P-CSCF 220 and the S-CSCF 230, similarly as in step 2j of FIG. 2. If the UE IP address 106 has changed, the proxy 210 maps the new UE IP address 106 to the one by which the UE 110 is known in the IMS 200, that is, the proxy IP address 206, before delivering messages originating from the UE 110 to the IMS 200, and likewise for messages incoming in the reverse direction.

Figure 4:
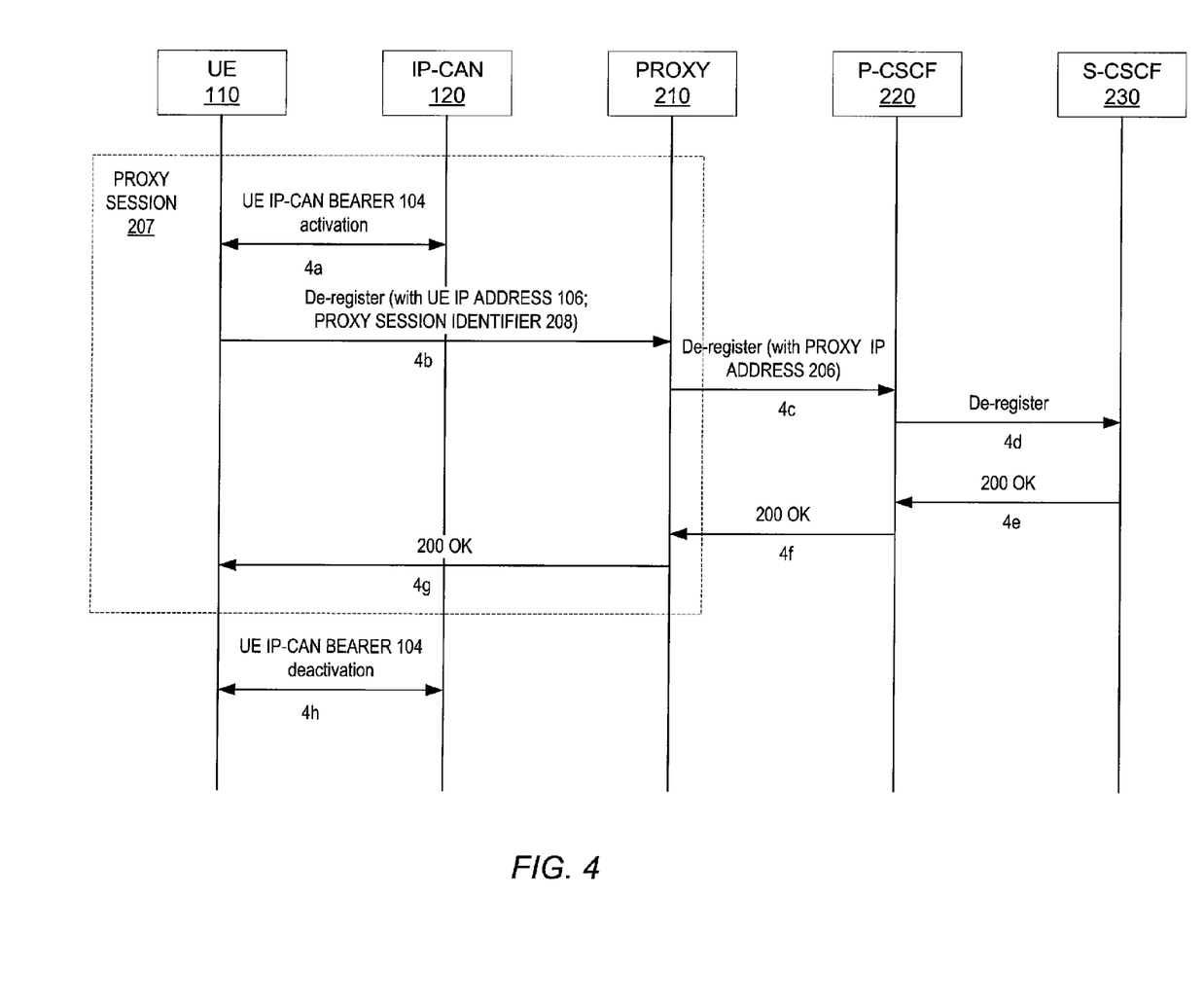
FIG. 4 illustrates a UE-originated de-registration call flow according to another embodiment of the present invention.

FIG. 4 illustrates one exemplary embodiment of the present invention in which the UE 110 requests to de-register from the IMS 200. In this figure prior to step 4a, the UE 110 and the proxy 210 have an open proxy session 207, but the UE 110 does not have an active UE IP-CAN bearer 104, and the UE 110 determines to de-register from the IMS 200. One reason the UE 110 may determine to de-register from the IMS 200 would be in the case that a UE power down condition is pending. Another reason the UE 110 may determine to de-register from the IMS 200 would be that the UE 110 no longer requires IMS services.

In order to send the IMS de-registration request, the UE 110 activates the UE IP-CAN bearer 104 to acquire a UE IP address 106 (step 4a). Once the UE IP-CAN bearer 104 is activated, the UE 110 then sends the IMS de-registration request to the proxy 210 (step 4b), which is relayed from the proxy 210 to the S-CSCF 230 via the P-CSCF 220 (steps 4c and 4d). The UE 110 invalidates the proxy session identifier 208 after successfully sending the IMS de-registration request. The UE 110 does not need to wait for the response to the IMS de-registration request in order to invalidate the proxy session identifier 208, particularly in the case of a power down condition, during which the UE IP-CAN bearer 104 may be lost prior to response from the proxy 210.

The S-CSCF 230 indicates a successful de-registration by replying with a "200 OK" indication, which is then forwarded to the proxy 210 (steps 4e and 4f). The proxy 210 then sends the "200 OK" success confirmation to the UE 110 (step 4g) and both the proxy 210 and the UE 110 now consider the proxy session 207 closed. The UE 110 then deactivates the UE IP-CAN bearer 104 (step 4h) and the proxy 210 no longer maintains the proxy IP-CAN bearer 204 to the IMS 200 on behalf of the UE 110.

Figure 5:
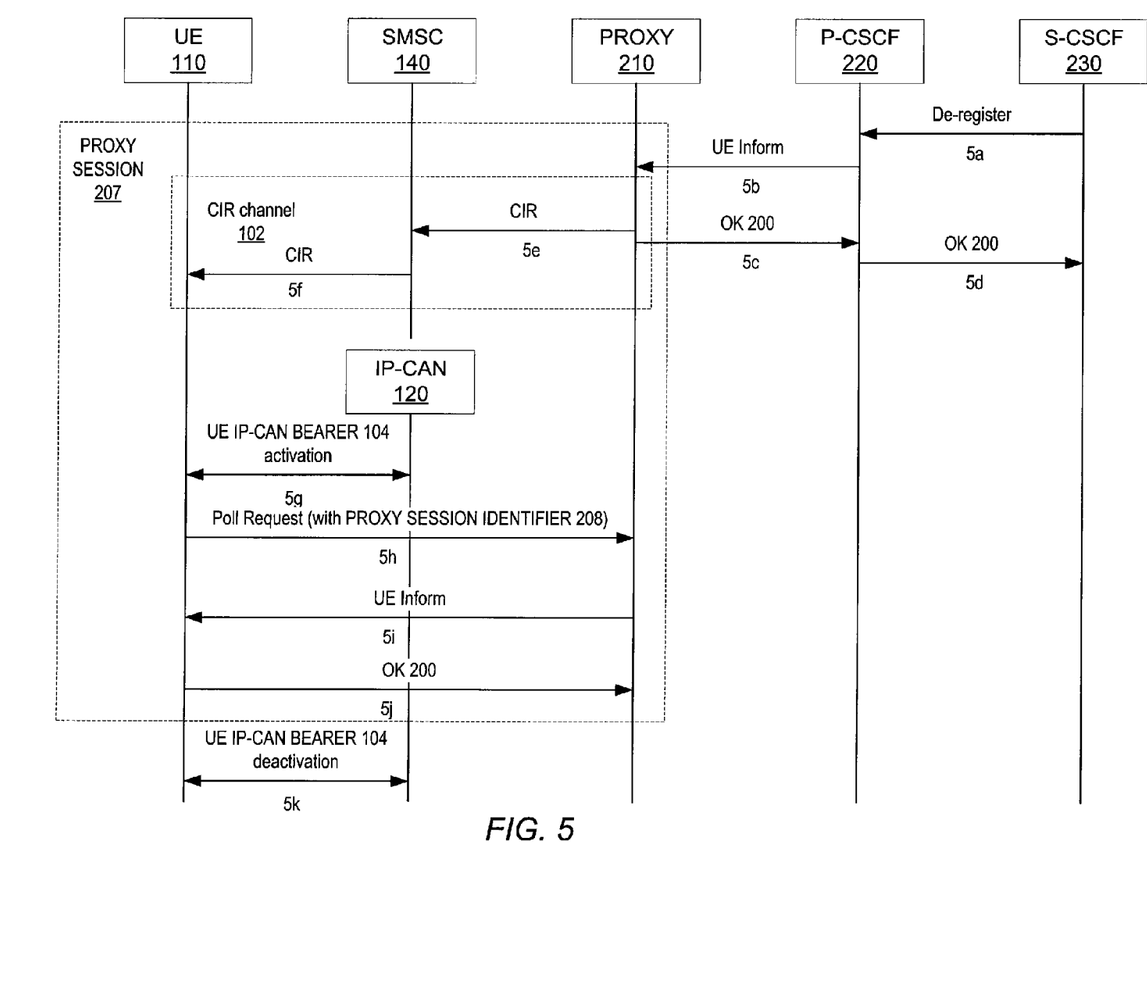
FIG. 5 illustrates an IMS-originated de-registration call flow according to another embodiment of the present invention.

FIG. 5 illustrates one exemplary embodiment of the present invention in which the IMS 200 de-registers the UE 110 from the IMS 200. In this figure prior to step 5a, the UE 110 and the proxy 210 have an open proxy session 207, but the UE 110 does not have an active UE IP-CAN bearer 104. The S-CSCF 230 sends a de-register message to the P-CSCF 220 (step 5a), which in turn sends a UE inform message to the proxy 210 (step 5b). The proxy 210 sends an "OK 200" success confirmation to the P-CSCF 220 (step 5c), which the P-CSCF 220 forwards to the S-CSCF 230 (step 5d). The proxy 210 detects that the UE 110 does not have an active UE IP-CAN bearer 104, but does have an active proxy session 207, and therefore sends a communication initiation request (CIR) over the CIR channel 102 to the UE 110 (steps 5e and 5f) and stores the UE inform message in memory. Upon receipt of the CIR, the UE 110 activates the UE IP-CAN bearer 104 and sends a poll request to the proxy 210 (steps 5g and 5h). The proxy 210 responds to the poll request sent from the UE 110 by forwarding the stored UE inform message to the UE 110 (step 5i), to which the UE 110 responds with an "OK 200" success confirmation (step 5j). Both the proxy 210 and the UE 110 now consider the proxy session 207 closed, and the UE 110 invalidates the stored proxy session identifier 208. The UE 110 then deactivates the UE IP-CAN bearer 104 (step 5k) and the proxy 210 no longer maintains the proxy IP-CAN bearer 204 to the IMS 200 on behalf of the UE 110.

Figure 6:
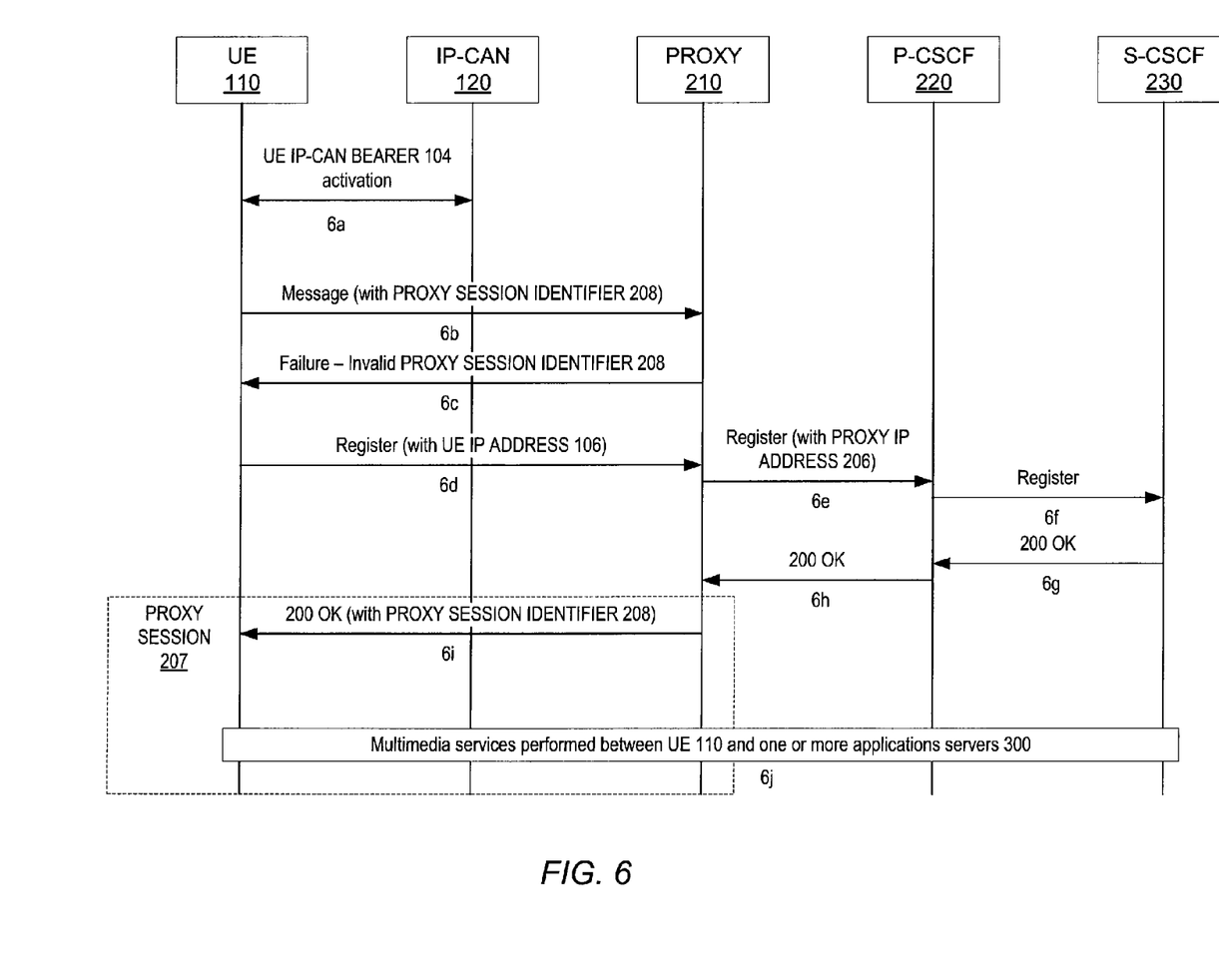
FIG. 6 illustrates an invalid proxy session failure call flow according to another embodiment of the present invention.

FIG. 6 illustrates one exemplary embodiment of the present invention in which the proxy session identifier 208 provided by the UE 110 in a message to the proxy 210 does not correspond to the open proxy session 207, or the proxy session 207 is closed. In order to send the message from the IMS 200, the UE 110 activates the UE IP-CAN bearer 104 to acquire a UE IP address 106 (step 6a). Once the UE IP-CAN bearer 104 is activated, the UE 110 then sends the message to the proxy 210 with the proxy session identifier 208 (step 6b), to which the proxy 210 responds with a failure indication denoting that the supplied proxy session identifier 208 in the message from the UE 110 is invalid (step 6c). Therefore, the UE 110 sends a new IMS registration request, which is forwarded to the S-CSCF 230 via the proxy 210 in the P-CSCF 220 (steps 6d, 6e, and 6f). Registration is successful and the S-CSCF 230 replies with a "200 OK" indication, which is forwarded from the P-CSCF 220 to the proxy 210 (steps 6g and 6h). The proxy 210 then sends the "200 OK" success confirmation to the UE 110 and includes a new proxy session identifier 208 in the confirmation that identifies the proxy session 207 now established (step 6*i*). Further messages can then be exchanged, and multimedia services are performed between the UE 110 and one or more application servers 300 (step 6*j*), where the transactions carrying these services are relayed through the proxy 210, the P-CSCF 220 and the S-CSCF 230, similarly as in step 2*j* of FIG. 2.

Figure 7:
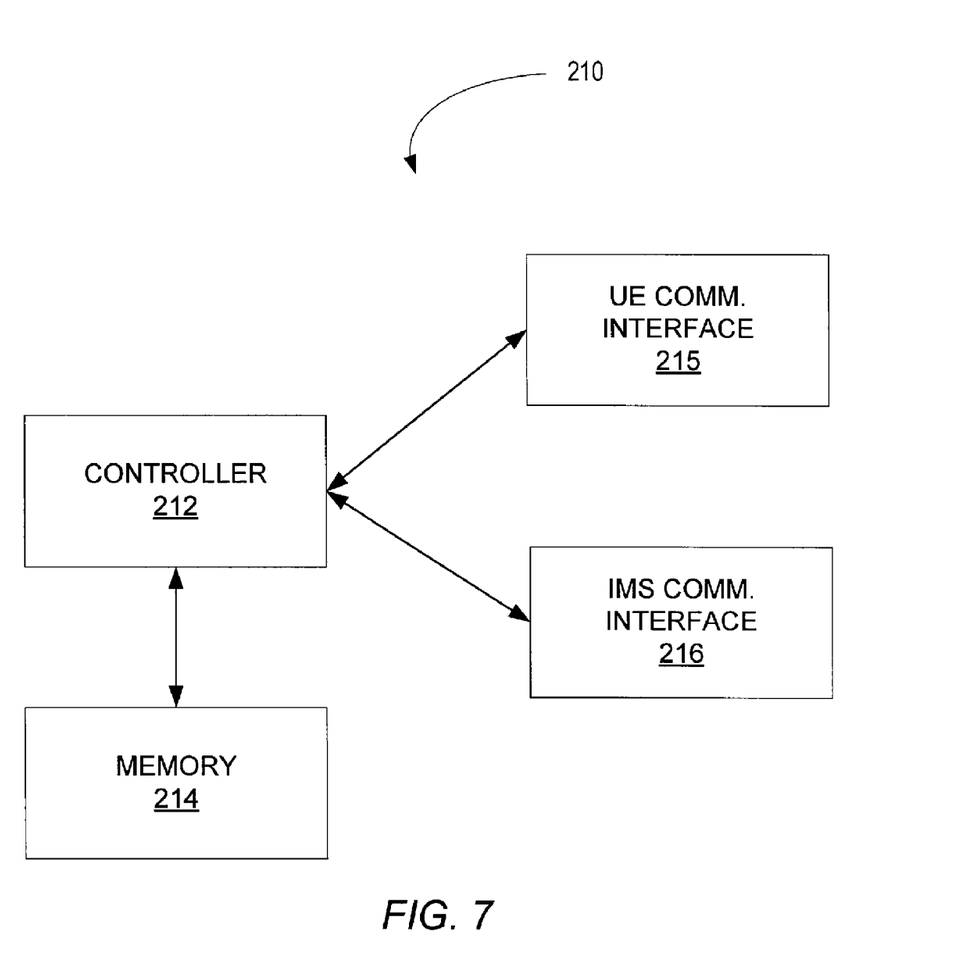
FIG. 7 is a block diagram illustrating some of the component parts of a proxy configured to operate according to one embodiment of the present invention.

A FIG. 7 is a block diagram that illustrates some of the functional components of the proxy 210 configured according to one embodiment of the present invention. As seen in FIG. 7, the proxy 210 comprises a controller 212, memory 214, a first communication interface 215 to communicate with the IMS 200 and a second communication interface 216 to communicate with the UE 110 via the IP-CAN 120.

Controller 212 may comprise one or more microprocessors, and controls the proxy 210 according to instructions and data stored in memory 214. According to the present invention, such instructions include the logic necessary to activate the proxy IP-CAN bearer 204 to communicate with the IMS 200; and forward to the IMS 200, via the proxy IP-CAN bearer 204, an IMS registration request on behalf of the UE 110. Additionally, for example, the logic may configure the controller 212 to open the proxy session 207 between the UE 110 and the proxy 210; send a response to the UE 110 corresponding to the IMS registration request; and provide to the UE 110 the proxy session identifier 208 for the proxy session 207. The instructions also include the logic necessary to cause the controller 212 to maintain the proxy IP-CAN bearer 204 to communicate with the IMS 200 as long as the proxy session 207 exists without regard to the existence of the UE IP-CAN bearer 104 activated by the UE 110.

Figure 8:
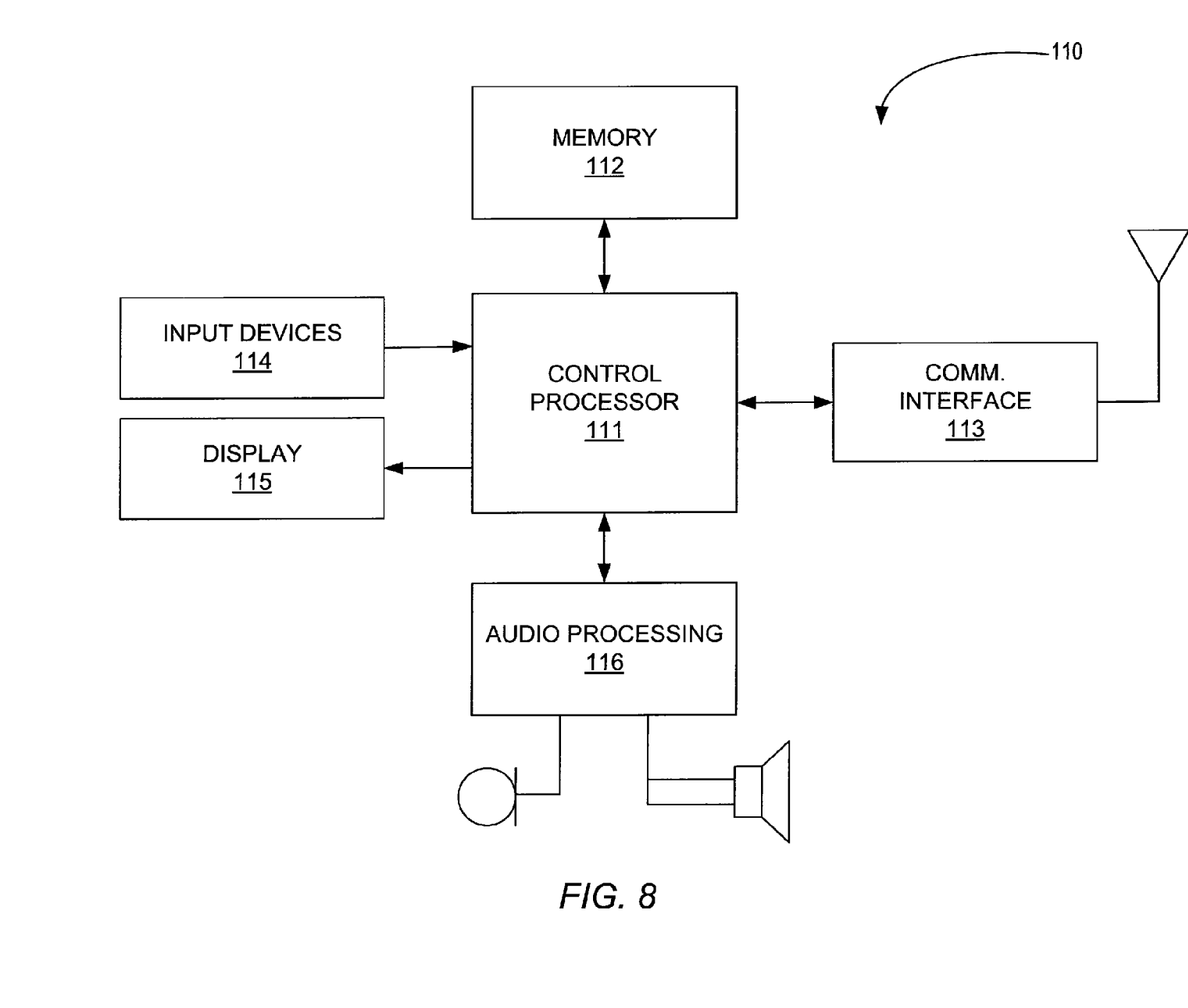
FIG. 8 is a block diagram illustrating some of the component parts of a UE configured to operate according to one embodiment of the present invention.

FIG. 8 illustrates an exemplary UE 110 according to the present invention. UE 110 comprises a control processor 111, memory 112, a communication interface 113, one or more input devices 114, a display 115, audio processing circuits 116, a microphone 117, and speaker 118. The control processor 111 may comprise one or more processors, hardware, firmware, or a combination thereof. Memory 112 comprises one or more memory devices and stores one or more IMS applications and an IMS protocol stack. The IMS applications could be for example, an instant messaging client, a PTT client, and a telephony client. The IMS protocol stack allows for IMS communication to the proxy to provide access for the IMS applications. The communication interface 113 comprises a fully functional transceiver, which may operate according to any known or future standards, including GSM, W-CDMA, WiFi, WiMax, etc. Input devices 114 and display 115 provide a user interface to enable the user to control and interact with the device. Input device 114 may, for example, comprise keypads, one or more function keys, touchpad, joystick control, etc. Display 115 may comprise a liquid crystal display. A touch screen display that also functions as an input device 114 could also be used. Audio processing circuits process voice and other audio signals input via microphone 117 or output to the speaker 118.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented by a proxy of maintaining registration in an IP Multimedia Subsystem (IMS) network for a user equipment, the method comprising:

receiving an IMS registration request for an IMS network from a user equipment, via an IP connectivity access network (IP-CAN) bearer connecting the user equipment to the proxy;

opening a proxy session for the user equipment;

establishing a registration within said IMS network for IMS services on behalf of the user equipment; and maintaining the registration for the user equipment for the duration of the proxy session even while an IP-CAN bearer connecting the user equipment to the proxy does not exist.

2. The method of claim 1 wherein establishing a registration within said IMS network for IMS services on behalf of the user equipment comprises:

receiving a first registration request message from the user equipment at the proxy including a first IP address associated with the user equipment;

activating a second IP-CAN bearer connecting said proxy to said IMS network responsive to said first registration request;

allocating a second IP address associated with the proxy to the user equipment from a pool of IP addresses maintained by said proxy; and registering the user equipment with an IMS server using the second IP address.

3. The method of claim 2 wherein registering the user equipment using the second IP address comprises:

replacing the first IP address associated with the user equipment in the first registration message with the second IP address associated with the proxy to create a modified registration request message;

storing an association in memory linking the first IP address associated with the user equipment with the second IP address used to register the user equipment; and sending the modified registration request message from the proxy to an IMS server in the IMS network.

4. The method of claim 1 further comprising:

acquiring a user equipment identifier for the user equipment that uniquely identifies the user equipment within an access network; and opening a communication initiation request (CIR) channel to the user equipment using the user equipment identifier.

5. The method of claim 4 wherein acquiring a user equipment identifier comprises receiving the user equipment identifier from the user equipment.

6. The method of claim 4 further comprising:

receiving an IMS service message for the user equipment after the user equipment has terminated the IP-CAN bearer connecting the user equipment to the proxy;

determining whether the user equipment has an IP-CAN bearer connecting the user equipment to the proxy; and if the user equipment does not have an active IP-CAN connecting the user equipment to the proxy, sending a communication initiation request to the user equipment over the CIR channel responsive to the receipt of the IMS service message.

7. The method of claim 6 further comprising:

storing the IMS service message in memory if the user equipment does not have an active IP-CAN connecting the user equipment to the proxy; and forwarding the IMS service message to the user equipment after activation by the user equipment of the IP-CAN bearer to the proxy.

8. The method of claim 6 further comprising:
receiving a poll request containing a session identifier from the user equipment responsive to the communication initiation request; and
forwarding said IMS service message to the user equipment responsive to the poll request.

9. The method of claim 8 wherein the poll request further contains an IP address assigned to the user equipment and wherein the IMS service message is sent to the IP address contained in the poll request.

10. The method of claim 6 further comprising closing the proxy session if the user equipment fails to activate the IP-CAN bearer to the proxy within a predetermined time period after sending the communication initiation request over the CIR channel.

11. The method of claim 6 further comprising closing the proxy session if the user equipment fails to activate the IP-CAN bearer to the proxy after a predetermined number of CIRs are sent to the user equipment over the CIR channel.

12. The method of claim 8 further comprising sending a reply to said poll request with a failure indication if the session identifier in the poll request does not match an open proxy session.

13. The method of claim 6 wherein determining whether the user equipment has an IP-CAN bearer connecting the user equipment to the proxy comprises determining whether the user equipment has an open TCP socket connection.

14. The method of claim 1 wherein maintaining the registration for the user equipment comprises maintaining a second IP-CAN bearer connecting the proxy to the IMS network.

15. The method of claim 14 wherein maintaining the registration for the user equipment further comprises sending one or more periodic re-registration messages from the proxy to the IMS server during the proxy session.

16. The method of claim 1 further comprising closing said proxy session responsive to a request from the user equipment to de-register.

17. The method of claim 1 further comprising relaying transactions between the user equipment and a server in the IMS network.

18. A proxy for an IP multimedia subsystem (IMS) network, said proxy comprising:
a first communication interface for communicating with said IMS network;
a second communication interface for communicating with a user equipment; and
a controller operatively connected to the first communication interface and the second communication interface and configured to:
receive an IMS registration request for an IMS network from a user equipment, via an IP connectivity access network (IP-CAN) bearer connecting the user equipment to the proxy;
open a proxy session for the user equipment;
establish a registration within said IMS network for IMS services on behalf of the user equipment; and
maintain the registration for the user equipment for the duration of the proxy session even while an IP-CAN bearer connecting the user equipment to the proxy does not exist.

19. The proxy of claim 18 wherein the controller establishes a registration within said IMS network for IMS services by:
receiving a first registration request message from the user equipment at the proxy including a first IP address associated with the user equipment;
activating a second IP-CAN bearer connecting said proxy to said IMS network responsive to said first registration request;
allocating a second IP address associated with the proxy to the user equipment from a pool of IP addresses maintained by said proxy; and
registering the user equipment with an IMS server using the second IP address.

20. The proxy of claim 19 wherein the controller is configured to register the user equipment using the second IP address by:
replacing the first IP address associated with the user equipment in the first registration message with the second IP address associated with the proxy to create a modified registration request message,
storing an association in memory linking the first IP address associated with the user equipment with the second IP address used to register the user equipment; and
sending the modified registration request message from the proxy to the IMS server in the IMS network.

21. The proxy of claim 18 wherein the controller is further configured to:
acquire a user equipment identifier for the user equipment that uniquely identifies the user equipment within an access network; and
to open a communication initiation request (CIR) channel to the user equipment using the user equipment identifier.

22. The proxy of claim 21 wherein the controller receives the user equipment identifier from the user equipment.

23. The proxy of claim 21 wherein the controller is further configured to:
receive an IMS service message for the user equipment after the user equipment has terminated the IP-CAN bearer connecting the user equipment to the proxy;
determine whether the user equipment has an active IP-CAN bearer connection the user equipment to the proxy; and
if the user equipment does not have an active IP-CAN connecting the user equipment to the proxy, send a communication initiation request (CIR) to the user equipment over the CIR channel responsive to the receipt of the IMS service message.

24. The proxy of claim 23 wherein the controller is further configured to:
store the IMS service message in memory if the user equipment does not have an active IP-CAN connecting the user equipment to the proxy; and
forward the IMS service message to the user equipment after activation by the user equipment of the IP-CAN bearer to the proxy.

25. The proxy of claim 23 wherein the controller is further configured to:
receive a poll request containing a session identifier from the user equipment responsive to the communication initiation request; and
to forward the IMS service message to the user equipment responsive to the poll request.

26. The proxy of claim 25 wherein the poll request further contains an IP address assigned to the user equipment and wherein the IMS service message is sent to the IP address contained in the poll request.

27. The proxy of claim 23 wherein the controller is further configured to close the proxy session if the user equipment fails to activate the IP-CAN bearer to the proxy within a predetermined time period after sending the communication initiation request over the CIR channel.

28. The proxy of claim 23 wherein the controller is further configured to close the proxy session if the user equipment fails to activate the IP-CAN bearer to the proxy after a predetermined number of connection initiation requests are sent to the user equipment over the CIR channel.

29. The proxy of claim 25 wherein the controller is further configured to send a reply to said poll request with a failure indication if the session identifier in the poll request does not match an open proxy session.

30. The proxy of claim 23 wherein the controller determines whether the user equipment has an IP-CAN bearer connecting the user equipment to the proxy by determining whether the user equipment has an open TCP socket connection.

31. The proxy of claim 18 wherein maintaining the registration for the user equipment comprises maintaining the IP-CAN bearer connecting the proxy to the IMS network.

32. The proxy of claim 31 wherein maintaining the registration for the user equipment further comprises sending one or more periodic re-registration messages from the proxy to the IMS server during the proxy session.

33. The proxy of claim 18 wherein the controller is further configured to close said proxy session responsive to a request from the user equipment to de-register.

34. The proxy of claim 18 wherein the controller is further configured to relay transactions between the user equipment and a server in the IMS network.

* * * * *